(12) United States Patent
Florentino

(10) Patent No.: US 9,304,960 B2
(45) Date of Patent: Apr. 5, 2016

(54) DELAYED PHYSICAL LINK ACTIVATION IN SERIAL ATTACHED SMALL COMPUTER SYSTEM INTERFACE DEVICES THAT UTILIZE SMART CABLING

(71) Applicant: LSI CORPORATION, San Jose, CA (US)

(72) Inventor: Gustavo Florentino, Colorado Spring, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 380 days.

(21) Appl. No.: 13/910,428

(22) Filed: Jun. 5, 2013

(65) Prior Publication Data

US 2014/0359177 A1    Dec. 4, 2014

Related U.S. Application Data

(60) Provisional application No. 61/830,999, filed on Jun. 4, 2013.

(51) Int. Cl.
G06F 13/00    (2006.01)
G06F 13/38    (2006.01)

(52) U.S. Cl.
CPC ................... *G06F 13/387* (2013.01)

(58) Field of Classification Search
USPC .......................................... 710/104
See application file for complete search history.

(56) References Cited

U.S. PATENT DOCUMENTS

| 6,138,178 | A   | * | 10/2000 | Watanabe ........................ 710/8 |
| 7,787,452 | B2  |   | 8/2010  | Jones |
| 8,566,460 | B1  | * | 10/2013 | Liu ........................ H04L 67/14 |
|           |     |   |         | 709/228 |
| 2002/0112040 | A1 | * | 8/2002 | Chang ................. H04L 41/5035 |
|           |     |   |         | 709/223 |
| 2003/0061339 | A1 | * | 3/2003 | Benfield ............. H04L 41/0213 |
|           |     |   |         | 709/224 |
| 2003/0093597 | A1 | * | 5/2003 | Marshak et al. ................. 710/52 |
| 2005/0113704 | A1 | * | 5/2005 | Lawson et al. ................. 600/513 |
| 2007/0260788 | A1 | * | 11/2007 | Blinick et al. ................ 710/100 |
| 2007/0294572 | A1 |   | 12/2007 | Kalwitz et al. |
| 2008/0010530 | A1 | * | 1/2008 | Davies et al. .................... 714/31 |
| 2012/0113971 | A1 | * | 5/2012 | Giaretta ................ H04W 48/20 |
|           |     |   |         | 370/338 |
| 2012/0317607 | A1 | * | 12/2012 | Wyatt ..................... G09G 5/006 |
|           |     |   |         | 725/127 |
| 2013/0339552 | A1 | * | 12/2013 | Wang ............................... 710/8 |
| 2014/0173156 | A1 | * | 6/2014  | Alshinnawi et al. .......... 710/305 |

* cited by examiner

*Primary Examiner* — Faisal M Zaman

(57) ABSTRACT

Methods and structure for delayed physical link activation in systems that utilize smart cabling are provided. The system includes a Serial Attached Small Computer System Interface (SAS) device comprising a physical link and a controller. The controller is able to disable the physical link to prevent discovery from occurring along the physical link, to detect a cable attached to a physical link, to acquire cable parameters from a memory of the cable, and to configure the physical link based on the acquired cable parameters to enable communications along the cable. The controller is also able to enable the configured physical link to trigger discovery for the physical link.

20 Claims, 4 Drawing Sheets

DELAYED PHYSICAL LINK ACTIVATION IN SERIAL ATTACHED SMALL COMPUTER SYSTEM INTERFACE DEVICES THAT UTILIZE SMART CABLING

CROSS REFERENCE TO RELATED APPLICATIONS

This document claims priority to U.S. Provisional Patent Application No. 61/830,999 (filed on Jun. 4, 2013) entitled DELAYED PHYSICAL LINK ACTIVATION IN SERIAL ATTACHED SMALL COMPUTER SYSTEM INTERFACE DEVICES THAT UTILIZE SMART CABLING, which is hereby incorporated by reference.

FIELD OF THE INVENTION

The invention relates generally to Small Computer System Interface (SCSI) devices, and more specifically to Serial Attached SCSI (SAS) systems that utilize "smart" cabling.

BACKGROUND

SAS systems are capable of using "smart" cabling in order to speed up the configuration of individual physical links (PHYs). Smart cabling comprises any form of cabling that includes a signaling interface for SAS and that also includes a cable management interface. For example, lengths of smart cabling can include a management interface with an integrated memory. The integrated memory can describe how to configure a SAS PHY to properly utilize the cable. The integrated memory can describe a link rate for the cable, physical features of the cable (e.g., whether the cable is a passive cable that is not powered for communications, whether the cable is an active cable that should be powered for communications, whether the cable is optical, etc.), etc.

SUMMARY

Systems and methods herein disable PHYs at start of day in order to prevent SAS discovery at those PHYs. This keeps a PHY from participating in discovery until after it has been properly configured to communicate along the smart cabling. Preventing SAS discovery until the PHY has been properly configured helps to prevent link resets at the PHY that would otherwise cause the discovery process to repeat multiple times.

One exemplary embodiment is a Serial Attached Small Computer System Interface (SAS) device comprising a physical link and a controller. The controller is able to disable the physical link to prevent discovery from occurring along the physical link, to detect a cable attached to a physical link, to acquire cable parameters from a memory of the cable, and to configure the physical link based on the acquired cable parameters to enable communications along the cable. The controller is also able to enable the configured physical link to trigger discovery for the physical link.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
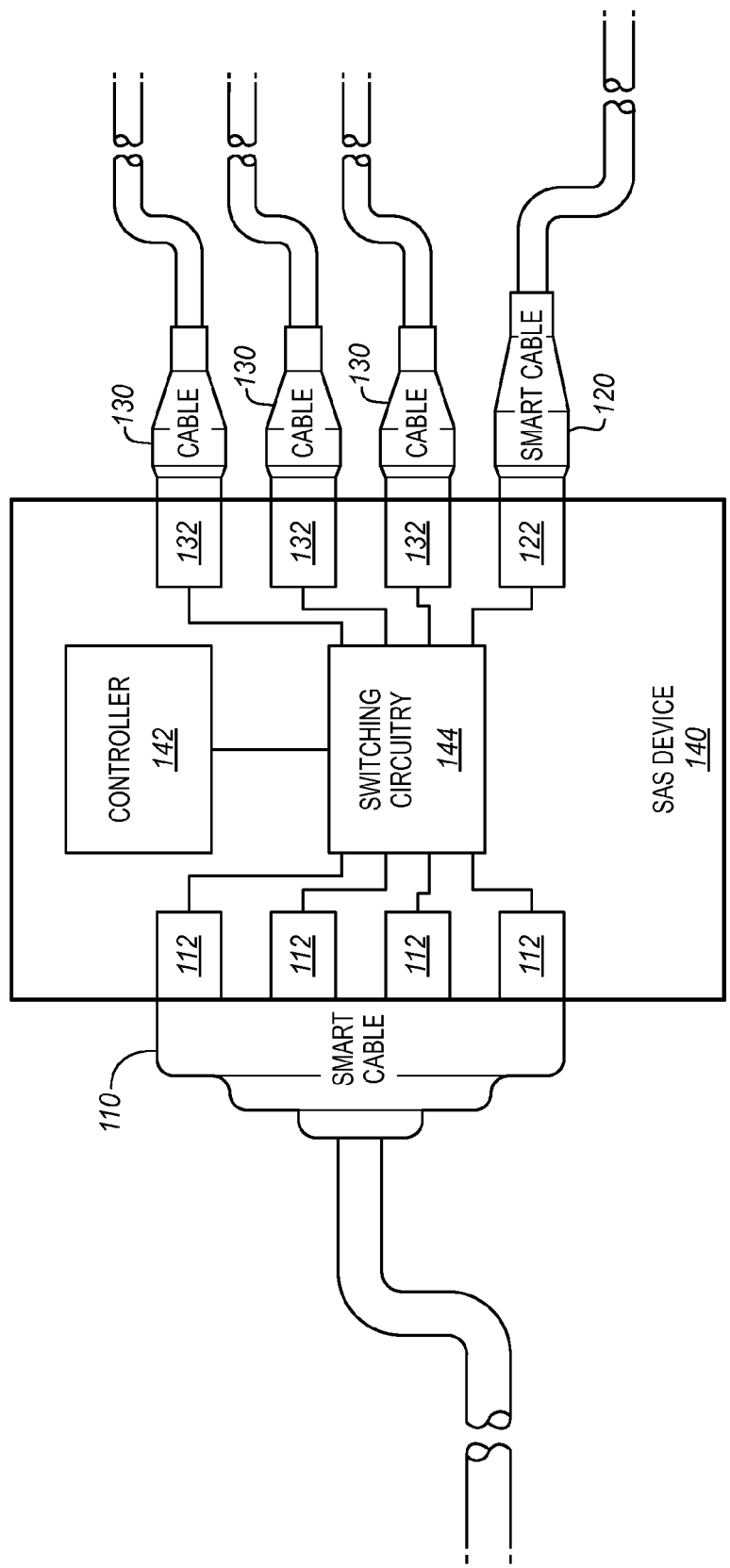
FIG. 1 is a block diagram illustrating an exemplary SAS device connected to other SAS devices via cables.

FIG. 1 is a block diagram 100 illustrating an exemplary SAS device 140 connected to other SAS devices via cables 110-130. SAS device 140 operates on a SAS domain, which is any suitable combination of SAS and/or Serial Advanced Technology Attachment (SATA) initiators and targets that are interconnected through a switched fabric of SAS expanders. On a SAS domain, connections are established between the initiators and the targets (known collectively as "end devices") in order to enable Input/Output (I/O) operations between those devices.

SAS initiators comprise any suitable initiator devices or components that are compliant with SAS protocols such as Serial SCSI Protocol (SSP), SATA Tunneling Protocol (STP), Serial Management Protocol (SMP), etc. For example, in one embodiment SAS initiators are Host Bus Adapters (HBAs) that utilize SSP to communicate with other end devices. SAS initiators establish connections with target devices through SAS expanders. Target devices comprise any SAS and/or SATA compliant target devices, such as persistent storage devices (e.g., disk drives, etc.).

Expanders comprise any suitable devices capable of establishing point-to-point connections between end devices in accordance with SAS protocols. In this embodiment, SAS device 140 is a SAS expander, although in other embodiments SAS device 140 may comprise a SAS initiator. SAS device 140 includes multiple PHYs 112, 122, and 132. Each PHY can be connected to cabling in order to couple expander 140 to another SAS device. The PHYs are controllably interconnected by switching circuitry 144 in order to establish connections between the end devices of the SAS domain. Controller 142 of expander 140 manages the operations of expander 140 as it services the various connections. Controller 142 can be implemented as custom circuitry, a processor executing programmed instructions stored in program memory, or some combination thereof. The particular arrangement, number, and configuration of components described herein is exemplary and non-limiting.

According to FIG. 1, SAS device 140 is connected to smart cables as well as to other types of cable. Smart cable 120 is attached to PHY 122, smart cable 110 is attached to multiple PHYs 112, and other cables that are not smart cables are attached to PHYs 132. In this case, PHY 122 serves as a narrow port for smart cable 120, and the four PHYs 112 serve as a wide port for smart cable 110. PHYs 112 and 122 can each be disabled by controller 142 (e.g., at start-of-day in order to prevent the PHYs from linking up). Once the disabled PHYs have been configured based on information in the memory of the smart cable they are connected to, they can be activated. The newly configured and activated PHYs can then participate in discovery with other SAS devices. PHYs 132, which are not connected to smart cables, can be enabled as soon as controller 132 determines that cables 330 do not include a management interface. Thus, PHYs 132 can be allowed to link up earlier than PHYs 112.

Further details of the operation of SAS device 140 will be described with regard to FIG. 2. Assume for this embodiment that SAS device 140 has just been powered on.

Figure 2:
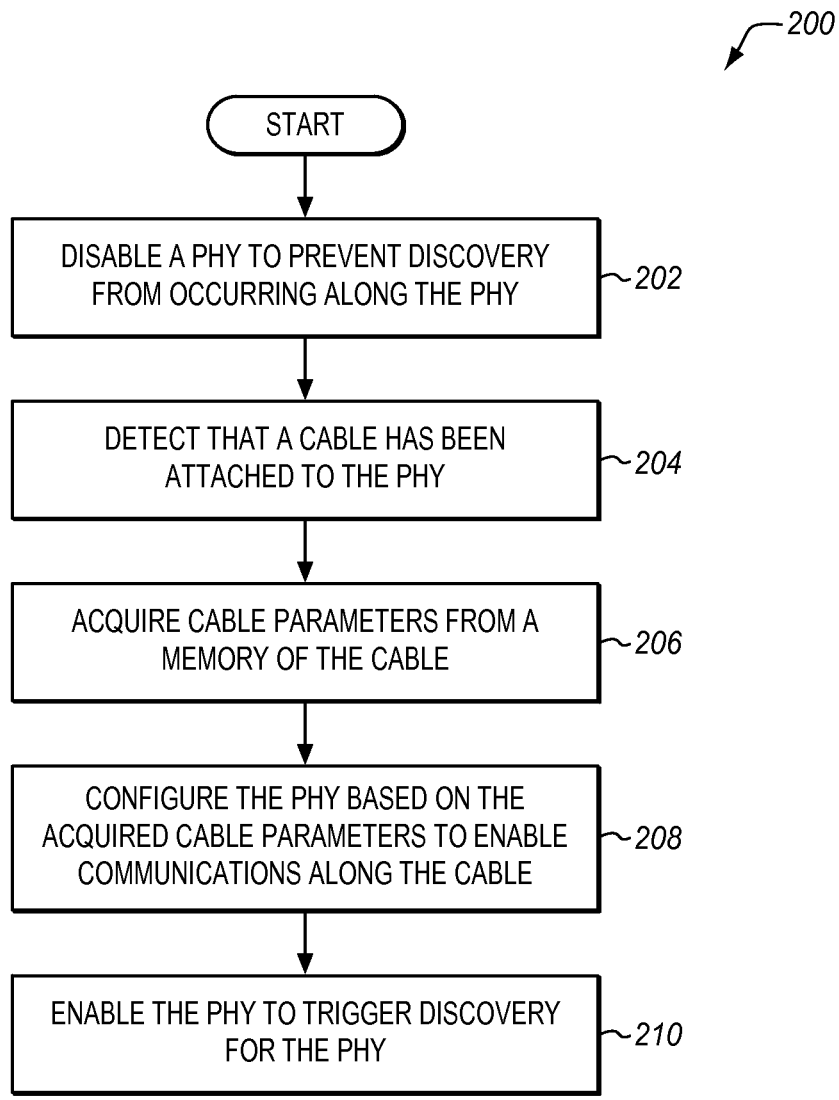
FIG. 2 is a flowchart describing an exemplary method for operating a SAS device.

FIG. 2 is a flowchart describing an exemplary method 200 for operating a SAS device. In step 202, controller 142 disables PHY 122. This can occur at power-on for SAS device 140. In one embodiment, the act of disabling the PHY comprises disabling the SAS transceiver connected to the signaling interface of the smart cable, without disabling the circuitry connected to the management interface of the smart cable.

Disabling a PHY can comprise any suitable method of preventing a PHY from engaging in discovery. For example, in one embodiment disabling the PHY comprises refraining from applying power to the PHY in order to keep the PHY from linking up. This prevents SAS Out-Of-Band (OOB) signaling at the PHY. Since discovery is performed after an OOB signaling sequence, discovery is also prevented. In a further embodiment, the PHY is disabled by leaving the PHY powered on, but preventing the PHY from transmitting any SAS discovery signaling.

In step 204, prior to enabling (e.g., powering on) a particular PHY 122, controller 142 detects that a smart cable has been attached to the PHY. The presence of a cable can for example be determined based on an electrical connection formed between the expander and the cable. In one embodiment, the cable can be detected by controller 142 even when PHY 122 is disabled (e.g., even when the transceiver/PHY used for SAS communications is disabled). For example, components of the SAS expander (which are not used for SAS signaling) can be used to detect the presence of the cable. Smart cables can be distinguished from other types of cable because smart cables each include a management interface that is separate from their SAS signaling interface.

Since the cable attached to PHY 122 has been determined to be a smart cable, controller 142 can apply power to a memory of the smart cable (e.g., via a management interface at the smart cable) in order to allow SAS device 140 to acquire data from the memory of the smart cable.

In step 206 controller 142 acquires cable parameters from the memory integrated into the smart cable. In one embodiment, the cable parameters are acquired by querying the memory through the management interface on the cable (e.g., through an interface of the cable that is physically distinct from the cabling used for SAS communications). The cable parameters indicate how to configure PHY 122 in order to properly utilize the smart cable to transmit data along the signaling interface. In one embodiment, the cable parameters indicate the type of cabling used in the smart cable (e.g., "passive" copper cabling that does not use electrical power to engage in SAS communications, "active" copper cabling that utilizes electrical power to engage in SAS communications, optical cabling, etc.), a link rate supported by the cabling, and other suitable properties.

Based on the cabling parameters, in step 208 controller 142 configures PHY 122 to enable SAS communications along the signaling interface of the smart cable. In one embodiment this step includes programming one or more registers for PHY 122 to enable it to properly use the smart cable to carry data between devices.

In step 210, controller 142 enables PHY 122, which allows PHY 122 to link up. As discussed in steps 204-208, PHY 122 was disabled and therefore not participating in discovery when the cable parameters were being acquired and PHY 122 was being reconfigured. This means that the change in the configuration of PHY 122 did not trigger any link resets that would have otherwise unduly extended the discovery process.

Method 200 can be performed within SAS device 140 for each PHY that is connected to a smart cable, and can be performed on a cable-by-cable or PHY-by-PHY basis. In cases where a specific PHY is not attached to a smart cable, method 200 can be bypassed and discovery along the PHY can be enabled at an earlier point in time (because cable parameters are acquired from the cabling in order to configure the PHY).

Even though the steps of method 200 are described with reference to SAS device 140 of FIG. 1, method 200 may be performed in other SAS devices (e.g., SAS initiators). The steps of the flowcharts described herein are not all inclusive and may include other steps not shown. The steps described herein may also be performed in an alternative order.

Examples

In the following examples, additional processes, systems, and methods are described in the context of a SAS device that performs delayed PHY activation/enablement.

Figure 3:
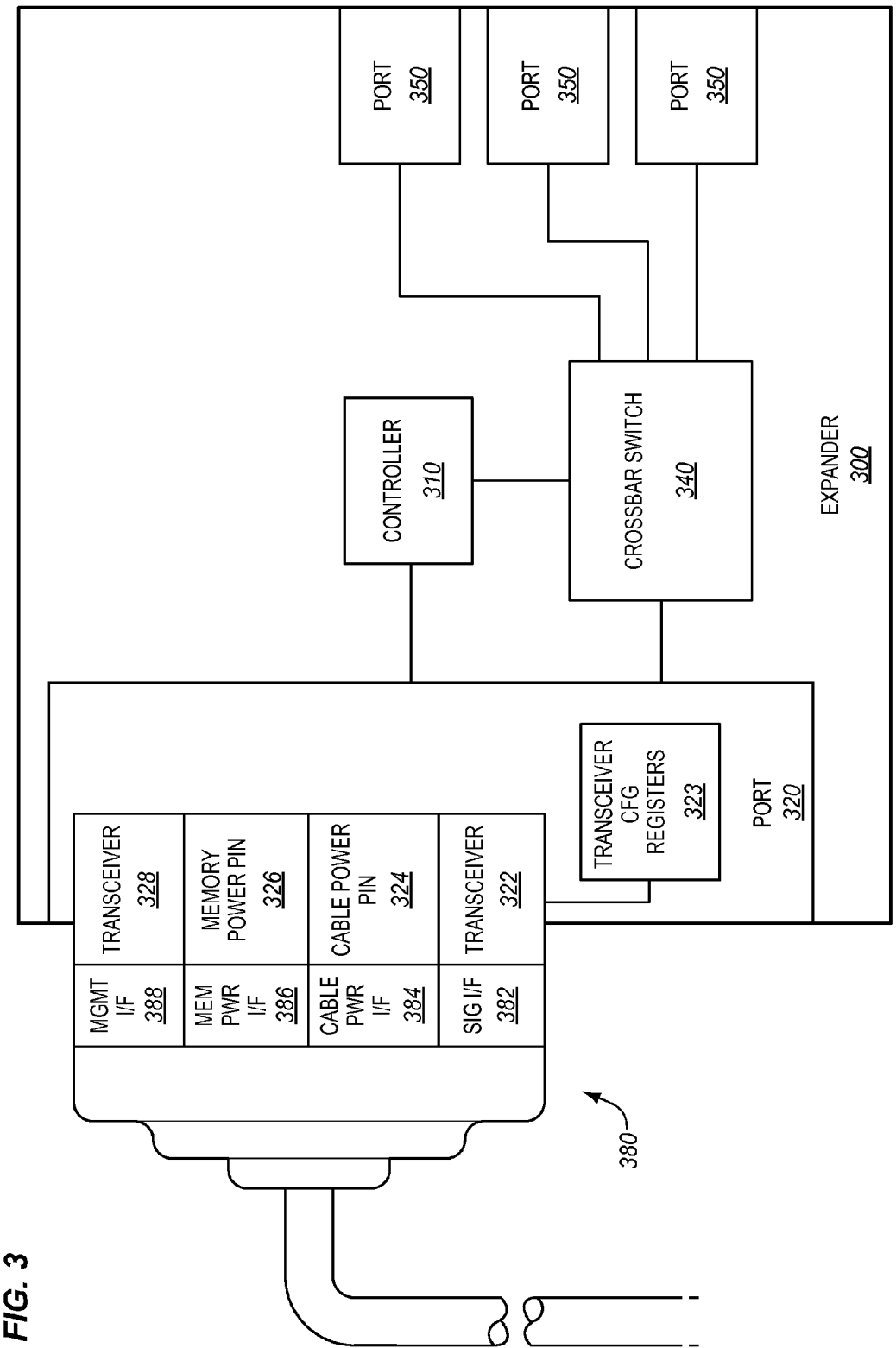
FIG. 3 is a block diagram illustrating an exemplary SAS expander.

FIG. 3 is a block diagram illustrating an exemplary SAS expander 300. In FIG. 3, SAS expander 300 includes ports 320, 350, 360, and 370. Each port is managed by controller 310, which during normal operations controls crossbar switch 340 to establish point-to-point connections between the ports. In this example, port 320 includes SAS transceiver 322, which operates as a SAS PHY to transmit and receive SAS signaling along a signaling interface 382 of attached smart cable 380. Smart cable 380 comprises a High Density Management Interface cable with its own management interface 388 in compliance with the Small Form Factor Committee 8449 (SFF-8449) standard. Each end of smart cable 380 includes a management interface 388 as well as a signaling interface 382.

At power-on, controller 310 disables transceiver 322 (the SAS PHY for SAS port 320) by turning it off. However, even though transceiver 322 is powered off, other elements of port 320 remain powered on or otherwise electrically active.

In this example, when smart cable 380 is attached (or when expander 300 is powered on), controller 310 listens along port 320 to detect the connection of management interface 388 and/or signaling interface 382. For example, controller 310 can operate transceiver 328 to detect that an attached cable includes a management interface. In one embodiment a ModPrsL pin, defined in the SFF-8449 standard, is used to detect the presence of the cable.

Since transceiver 328 is not connected to the signaling interface of smart cable 380, transceiver 328 does not communicate with other SAS devices and therefore is not a SAS PHY. For example, transceiver 328 does not participate in SAS discovery.

The memory of smart cable 380 exists in a dormant state until it is powered on using memory power interface 386. Controller 310 sends power through memory power pin 326 in order to activate the cable memory, and then controller 310 acquires cable parameters from the cable memory by operating transceiver 328 to acquire data from management interface 388. In this embodiment, management interface 388 comprises a two-wire differential signaling pathway.

The cable parameters acquired by controller 310 define smart cable 380 as a powered smart cable, and further define a link rate of 12 Gigabits per second (Gbps) for smart cable 380. Based on this information, controller 310 programs transceiver configuration registers 323, which are used by transceiver 322 to define characteristics of how to properly engage in SAS communications over the attached cable.

Since the cable parameters define the cable as an active powered cable, controller 310 applies power to cable power interface 384 via cable power pin 324. Controller 310 also switches power back on to transceiver 322 in order to enable it. After transceiver 322 has been enabled, it detects an enabled SAS transceiver (for another SAS device) at the other end of the smart cable. Controller 310 then operates transceiver 322 to initiate SAS discovery for port 320. Ports 350, 360 and 370 include similar elements to port 320, and are managed by controller 310 in a substantially similar manner.

Figure 4:
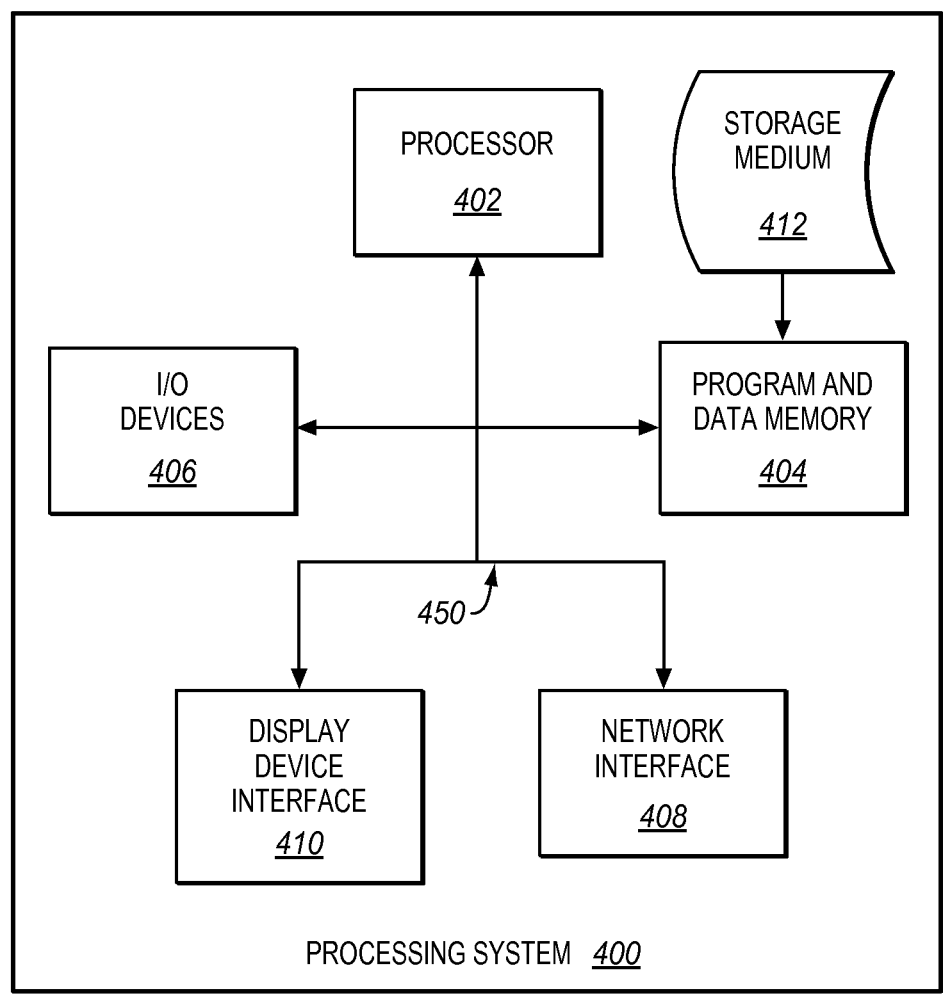
FIG. 4 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of a SAS expander and/or a SAS initiator to perform the various operations disclosed herein. FIG. 4 illustrates an exemplary processing system 400 operable to execute a computer readable medium embodying programmed instructions. Processing system 400 is operable to perform the above operations by executing programmed instructions tangibly embodied on computer readable storage medium 412. In this regard, embodiments of the invention can take the form of a computer program accessible via computer readable medium 412 providing program code for use by a computer (e.g., processing system 400) or any other instruction execution system. For the purposes of this description, computer readable storage medium 412 can be anything that can contain or store the program for use by the computer (e.g., processing system 400).

Computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to program and data memory 404 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc.) can be coupled either directly or through intervening I/O controllers. Network adapter interfaces 408 may also be integrated with the system to enable processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 410 may be integrated with the system to interface to one or more display devices, such as printing systems and screens for presentation of data generated by processor 402.

What is claimed is:

1. A system comprising:
a Serial Attached Small Computer System Interface (SAS) device comprising:
a SAS physical link (PHY); and
a controller operable to disable the PHY to prevent SAS discovery from occurring along the PHY, to detect a cable attached to the PHY, to acquire cable parameters for communication along the cable from a memory of the cable, to configure the PHY based on the cable parameters while the PHY is disabled, and to enable the PHY responsive to configuring the PHY, thereby triggering SAS discovery for the PHY.

2. The system of claim 1, wherein:
the controller is further operable to detect a management interface of the cable and a signaling interface of the cable, to contact the management interface of the cable to acquire the cable parameters, and to configure the PHY based on the cable parameters to enable communications along the signaling interface of the cable.

3. The system of claim 1, wherein:
the controller is further operable to analyze the cable parameters to determine whether the PHY is attached to a passive unpowered cable, an active powered cable, or an optical cable.

4. The system of claim 1, wherein:
the controller is further operable to disable multiple PHYS to prevent SAS discovery from occurring, to identify a cable attached to the multiple PHYs, to configure each PHY attached to the cable based on the cable parameters to enable communications along the cable, and to enable each of the configured PHYs.

5. The system of claim 1, wherein:
the controller is further operable to configure the PHY by programming internal registers of the SAS device.

6. The system of claim 1, wherein:
the system comprises a SAS expander.

7. The system of claim 1, wherein:
the system comprises a SAS initiator.

8. The system of claim 1, wherein:
the cable comprises a High Density Management Interface cable.

9. A method comprising:
disabling a Serial Attached Small Computer System Interface (SAS) physical link (PHY) of a SAS device to prevent SAS discovery from occurring along the PHY;
detecting that a cable has been attached to the PHY of the device;
acquiring cable parameters for communication along the cable from a memory of the cable;
configuring the PHY based on the cable parameters while the PHY is disabled; and
enabling the PHY responsive to configuring the PHY, thereby triggering SAS discovery for the PHY.

10. The method of claim 9, further comprising:
detecting a management interface of the cable and a signaling interface of the cable;
contacting the management interface of the cable to acquire the cable parameters; and configuring the PHY based on the cable parameters to enable communications along the signaling interface of the cable.

11. The method of claim 9, further comprising:
analyzing the cable parameters to determine whether the PHY is attached to a passive unpowered cable, an active powered cable, or an optical cable.

12. The method of claim 9, further comprising:
disabling multiple PHYs to prevent SAS discovery from occurring;
identifying that a cable has been attached to the multiple PHYs;
configuring each PHY attached to the cable based on the cable parameters to enable communications along the cable; and
enabling each of the configured PHYs.

13. The method of claim 9, further comprising:
configuring the PHY by programming internal registers of the SAS device.

14. The method of claim 9, wherein:
the device comprises a SAS expander.

15. The method of claim 9, wherein:
the device comprises a SAS initiator.

16. The method of claim 9, wherein:
the cable comprises a High Density Management Interface cable.

17. A non-transitory computer readable medium embodying programmed instructions which, when executed by a processor, are operable for performing a method comprising:
disabling a Serial Attached Small Computer System Interface (SAS) physical link (PHY) of a SAS device to prevent SAS discovery from occurring along the PHY;
detecting that a cable has been attached to the PHY of the device;
acquiring cable parameters for communication along the cable from a memory of the cable;
configuring the PHY based on the cable parameters while the PHY is disabled; and
enabling the PHY responsive to configuring the PHY, thereby triggering SAS discovery for the PHY.

18. The medium of claim 17, the method further comprising:
detecting a management interface of the cable and a signaling interface of the cable;
contacting the management interface of the cable to acquire the cable parameters; and
configuring the PHY based on the cable parameters to enable communications along the signaling interface of the cable.

19. The medium of claim 17, the method further comprising:
analyzing the cable parameters to determine whether the PHY is attached to a passive unpowered cable, an active powered cable, or an optical cable.

20. The medium of claim 17, the method further comprising:
disabling multiple PHYs to prevent SAS discovery from occurring;
identifying that a cable has been attached to the multiple PHYs; configuring each PHY attached to the cable based on the cable parameters to enable communications along the cable; and
enabling each of the configured PHYs.

* * * * *